United States Patent
Beser

(10) Patent No.: US 9,112,725 B2
(45) Date of Patent: *Aug. 18, 2015

(54) DYNAMIC VLAN IP NETWORK ENTRY

(71) Applicant: Telsima Corporation, Sunnyvale, CA (US)

(72) Inventor: Nurettin Burcak Beser, Palo Alto, CA (US)

(73) Assignee: Telsima Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/195,540

(22) Filed: Mar. 3, 2014

(65) Prior Publication Data

US 2014/0226622 A1    Aug. 14, 2014

Related U.S. Application Data

(63) Continuation of application No. 11/748,468, filed on May 14, 2007, now Pat. No. 8,665,871.

(60) Provisional application No. 60/747,170, filed on May 12, 2006, provisional application No. 60/747,165, filed on May 12, 2006.

(51) Int. Cl.
*H04L 12/46* (2006.01)
*H04W 36/00* (2009.01)

(52) U.S. Cl.
CPC ....... *H04L 12/4645* (2013.01); *H04W 36/0055* (2013.01)

(58) Field of Classification Search
None
See application file for complete search history.

(56) References Cited

U.S. PATENT DOCUMENTS

| | | | |
|---|---|---|---|
| 6,041,358 A | 3/2000 | Huang et al. | |
| 6,181,699 B1 | 1/2001 | Crinion et al. | |
| 6,947,739 B2 | 9/2005 | Yokoyama | |
| 7,693,513 B2 | 4/2010 | Chou | |
| 8,665,871 B2 * | 3/2014 | Beser | 370/392 |
| 2002/0191567 A1 | 12/2002 | Famolari et al. | |
| 2004/0202171 A1 | 10/2004 | Hama | |
| 2005/0163131 A1 | 7/2005 | Tonnby et al. | |
| 2005/0171995 A1 | 8/2005 | Grindahl et al. | |

(Continued)

OTHER PUBLICATIONS

International Application No. PCT/US2007/011658, Search Report and Written Opinion mailed Sep. 11, 2008.

(Continued)

*Primary Examiner* — Minh-Trang Nguyen
(74) *Attorney, Agent, or Firm* — Sheppard, Mullin, Richter & Hampton LLP

(57) ABSTRACT

Systems and methods for tagging packets in a wireless network are described. The methods can comprise detecting initial entry of subscriber equipment into a wireless network at a first base station and generating a network tag for the subscriber equipment, the network tag associating the subscriber equipment with the first base station. The tag can be distributed to other base stations and, upon reentry of the subscriber equipment to the network, a network connection can be configured for the subscriber equipment based on the tag. Detecting initial entry includes receiving a network entry packet including a unique identifier associated with the subscriber equipment. The network connection can be configured by providing an IP address assigned to the subscriber equipment and the IP address may be distributed through a relay agent instantiated for the network connection. The network tag can be an IEEE 802.1q tag, MPLS tag, etc.

13 Claims, 14 Drawing Sheets

(56) References Cited

U.S. PATENT DOCUMENTS

| | | |
|---|---|---|
| 2006/0007939 A1 | 1/2006 | Elangovan et al. |
| 2006/0130126 A1 | 6/2006 | Touve et al. |
| 2006/0182123 A1 | 8/2006 | Monette et al. |
| 2007/0053353 A1 | 3/2007 | Lee et al. |
| 2007/0064673 A1 | 3/2007 | Bhandaru et al. |
| 2008/0069024 A1 | 3/2008 | Iino et al. |

OTHER PUBLICATIONS

International Application No. PCT/US2007/011660, Search Report and Written Opinion mailed Apr. 21, 2008.
U.S. Appl. No. 11/748,468, Office Action mailed Jul. 12, 2010.
U.S. Appl. No. 11/748,468, Office Action mailed Mar. 30, 2011.
U.S. Appl. No. 11/748,476, Office Action mailed Feb. 24, 2010.
U.S. Appl. No. 11/748,476, Office Action mailed Jun. 5, 2009.

* cited by examiner

DYNAMIC VLAN IP NETWORK ENTRY

CROSS-REFERENCE TO RELATED APPLICATIONS

The present application is a continuation of and claims priority to U.S. patent application Ser. No. 11/748,468, filed May 14, 2007 and entitled "Dynamic VLAN IP Network Entry," now U.S. Pat. No. 8,665,871, which claims priority to U.S. Provisional Patent Application Ser. No. 60/747,170, filed May 12, 2006 and entitled "Dynamic VLAN IP Network Entry," and U.S. Provisional Patent Application Ser. No. 60/747,165, filed May 12, 2006 and entitled "Dynamic VLANs," all of which are incorporated by reference herein.

BACKGROUND OF THE INVENTION

1. Field of the Invention

The present invention relates generally to wireless terminals and more particularly to the mobility of addressing in wireless networks.

2. Description of Related Art

Wireless Broadband Access ("WBA") based systems have been designed to have operational characteristics that are indistinguishable from Cable or DSL methods of broadband access from the viewpoint of the customer. However, wireless systems are subject to network termination resulting from signal fading and subscriber mobility and subscriber equipment may be connected to the network through any of multiple network termination points. In contrast, DSL Modems can connect to a single DSLAM along a single physical cable that is shielded against external noise and thus, DSL systems does exhibit fading or have multiple termination points. In cable systems, a shielded coaxial cable connects the modem to a CMTS and relatively minor fading occurs due to various factors. Even in a multiple CMTS system, every CMTS experiences similar levels of fading and a cable modem is typically redirected to its originally connected CMTS when a disconnection occurs.

Wireless systems may be viewed as multiple logical modems connected through different Network Termination points via different virtual cables, where the system is able to pick the best signal strength at the time that it is connected to an end-point. As time passes fading on the virtual cable causes the logical modem to disconnect from its current base station and the subscriber station directs the modem to reconnect based on best available signal strength. This behavior can be repeated many times. Fading may be apparently random or based on predictable patterns.

Customer premises equipment ("CPE"), such as a personal computer ("PC"), may respond to fading by disconnecting from the network. Upon reconnection, conventional systems generally assign a new IP address thereby causing shut-down all prior network connections in use by application in the CPE. Active connections, whether IP streaming or download in progress, have to be terminated and re-started using the newly-obtained IP address. Also, in many business uses, connections are made from the Internet to the CPE as well from the CPE to the Internet. For these connections, the CPE IP address must be advertised when changed. Even when a dynamic domain name service ("dynamic DNS") method is implemented, DNS update can be a slow process, taking hours and sometimes days to propagate through the Internet.

For bridged base stations, the interaction of the base stations between which the subscriber connection transfers is significant. If the base stations are not in the same layer-2 network, then the latterly described problems apply. When the two base stations are within the same layer-2 network, the CPE need not change IP addresses and generally experiences a brief period of packet drop measurable in seconds. However, a new set of network topology problems will be observed. For example, any broadcast packet will be repeated over all connected base stations, potentially causing a broadcast storm. Malicious users could use broadcast storms to run theft of service and denial of service attacks. Furthermore, identification and debugging of network problems is made difficult.

The use of Dynamic VLANs may solve broadcast storm issues and may provide some IP address mobility. However, the initial IP address and VLAN assignment process can cause random distribution of IP addresses, resulting in an expanded and sometimes uncontrollable broadcast domain.

BRIEF SUMMARY OF THE INVENTION

Certain embodiments of the invention provide a method for tagging packets in a wireless network, comprising detecting at a first base station, initial entry of subscriber equipment into a wireless network, generating a unique network tag for the subscriber equipment, the network tag associating the subscriber equipment with the first base station, distributing the unique network tag to one or more other base stations, and configuring a network connection for the subscriber equipment based on the unique network tag upon reentry of the subscriber equipment to the network.

In certain embodiments, the configuring the network connection includes providing an IP address assigned to the subscriber equipment. In certain embodiments, the IP address is distributed through a relay agent instantiated for the network connection. In certain embodiments, the unique network tag is an IEEE 802.1q tag. In certain, the unique network tag is an MPLS tag.

Certain embodiments of the invention provide a method for managing entry of subscriber equipment into a virtual local area network ("VLAN"), comprising providing a base station with a plurality of network addresses associated with one or more VLANs, detecting initial entry of subscriber equipment into a wireless network at the base station, assigning a tag to the subscriber equipment that uniquely identifies the new subscriber equipment to the network, and distributing the tag to at least one other base station, wherein upon subsequent connections of the subscriber equipment, the at least one other base station is configured to connect the subscriber equipment to a VLAN identified by the tag.

In certain embodiments, the detecting initial entry includes the steps of receiving a network entry packet at the one base station, the network entry packet including a unique identifier associated with the subscriber equipment and adding the unique identifier to a list comprising a plurality of unique identifiers. In certain embodiments, the method further comprises propagating the list to the at least one other base station.

BRIEF DESCRIPTION OF THE DRAWINGS

The structural and functional aspects of the invention will become understood by those skilled in the art by reference to the following detailed description when taken in conjunction with the appended drawings, in which.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments enable the provision of wireless broadband access services that appear to have the same characteristics as wired ADSL or cable network services. Accordingly, inherent differences between wireless and wired network designs are accommodated and, in some embodiments, concealed. Differences between wired and wireless services include the effects of unpredictable fading that can occur in wireless networks and which can cause a subscriber station to occasionally disconnect from one base station and reconnect to a different base station.

Figure 1:
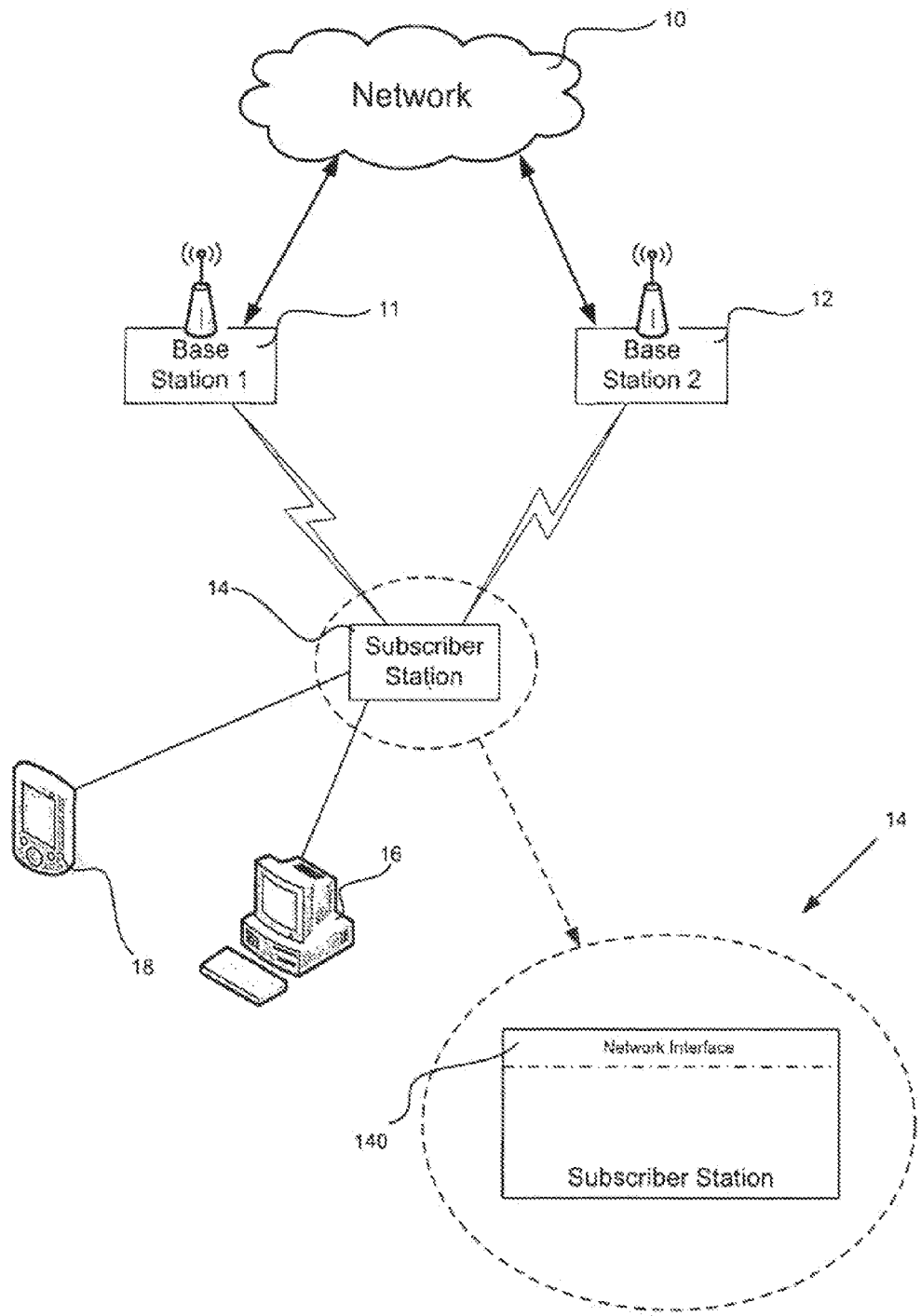
FIG. 1 illustrates a simple example of a wireless network.

With reference to FIG. 1, certain embodiments employ an architecture that can be implemented without significantly increasing system operational complexity and requiring little additional computation power. In one example, a subscriber station 14 includes a network interface 140 that can detect a first base station 11 and a second base station 12. The base stations 11 and 12 may provide signals from the same network using same or different frequencies, same or different modulation schemes and same or different data encoding standards. In some embodiments, subscriber station 14 may be configurable to communicate with base stations of different wireless networks. Certain aspects of the invention facilitate the construction of low-cost, reliable networks using, at the core, existing wireless infrastructure and components. Certain embodiments provide configuration methods together with a plurality of components, features and capabilities that address issues existing in conventional systems. In one example, the provided components can include debugging and maintenance tools that ease management of layer-2 networks that are otherwise difficult to maintain and debug due to their inherently flat topography. Debugging and maintenance tools may be configured and operated using customized configuration methods and interfaces. In many embodiments, the architecture may be implemented from combinations of existing network equipment.

Figure 2:
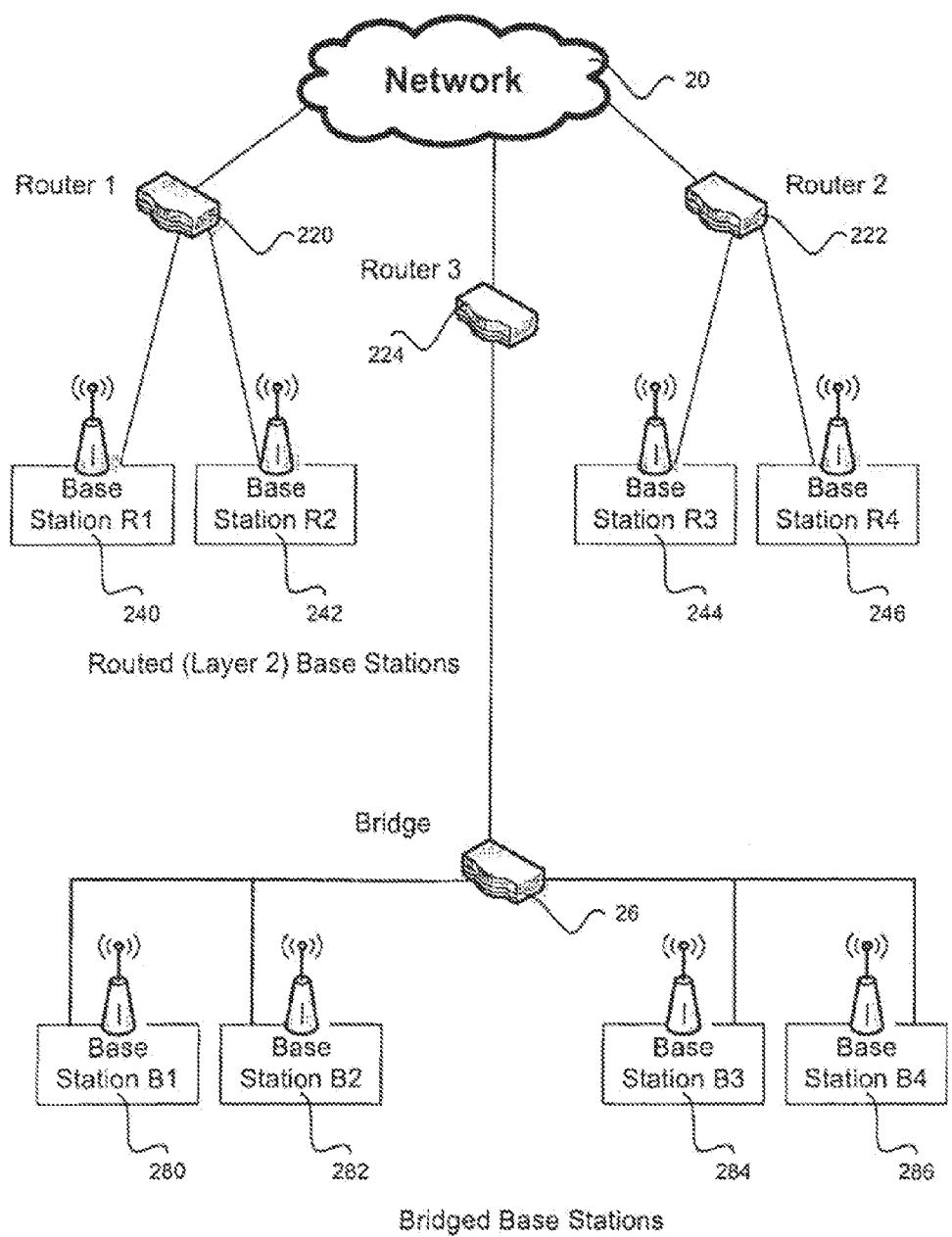
FIG. 2 depicts a network configuration comprising bridged and routed base stations.

FIG. 2 provides a simplified illustration of network topographies that can be used to connect base stations. In the example provided, routed base stations 240, 242, 244 and 246 connect to one another and to a network 20 through routers 220 and 222. Bridged base stations 280, 282, 284 and 286 connect to one another through bridge 26 which typically connects to the network 20 using a router 224. Certain embodiments address issues associated with conventional bridged and routed base stations and with conventional hybrid networks that include bridging and routing of base stations. For the purposes of convenience and clarity, the descriptions will highlight methods and systems that address issues prevalent in conventional flat networks that have large numbers of end-nodes, including flat bridged networks.

Certain embodiments provide dynamic tagging of packets at base stations. Dynamic tagging typically assigns tags to packets based on the interface at which the packet is received and based on other parameters. In one example, standards-based solutions can adapt and utilize existing technologies, such as IEEE 802.1Q VLANS standards. Broadcast messages are not relayed indiscriminately across the network, but are instead rebroadcast only to interfaces that are associated with a common VLAN tag. Dynamic tagging by base stations can resolve issues in conventional networks that provide no reliable agent to tag packets. For example, computer premises equipment cannot be trusted to tag packets consistently and subscriber stations are not required by WiMAX standards to tag packets with persistent VLAN information.

Figure 3:
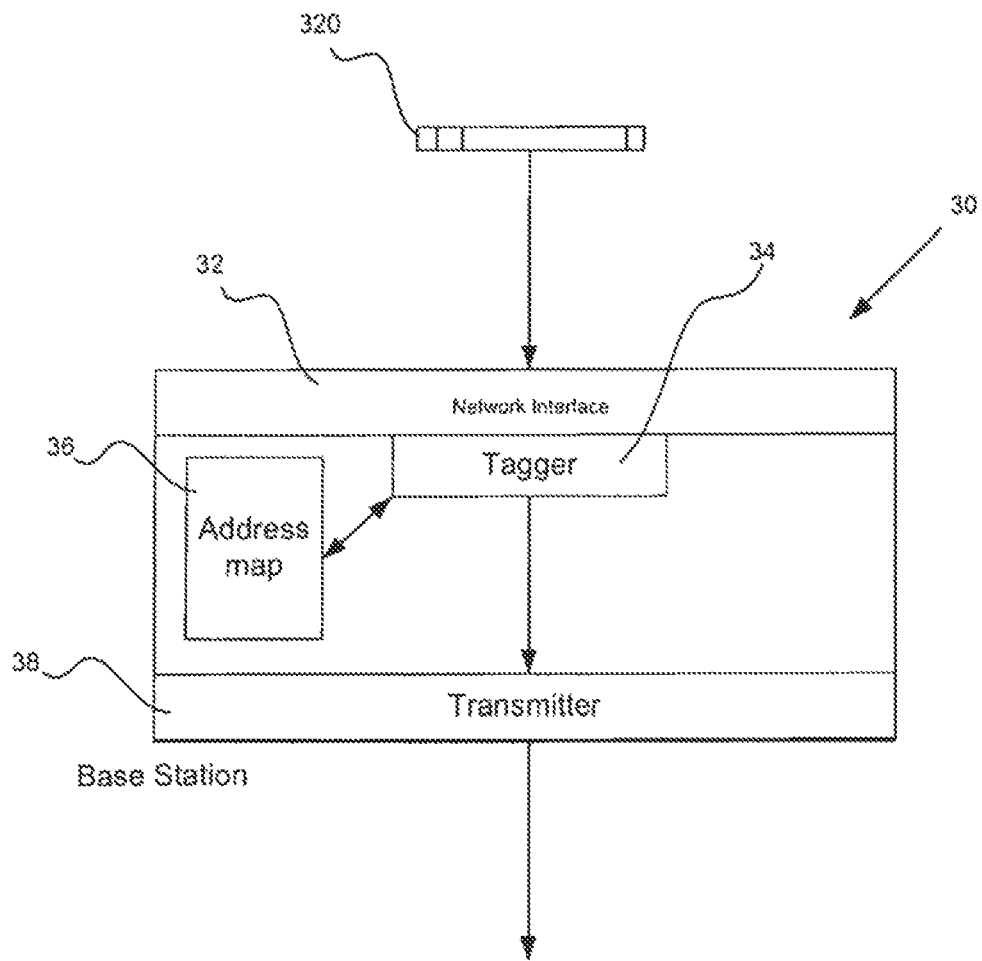
FIG. 3 depicts components of a base station configured according to certain aspects of the invention.
Figure 4A:
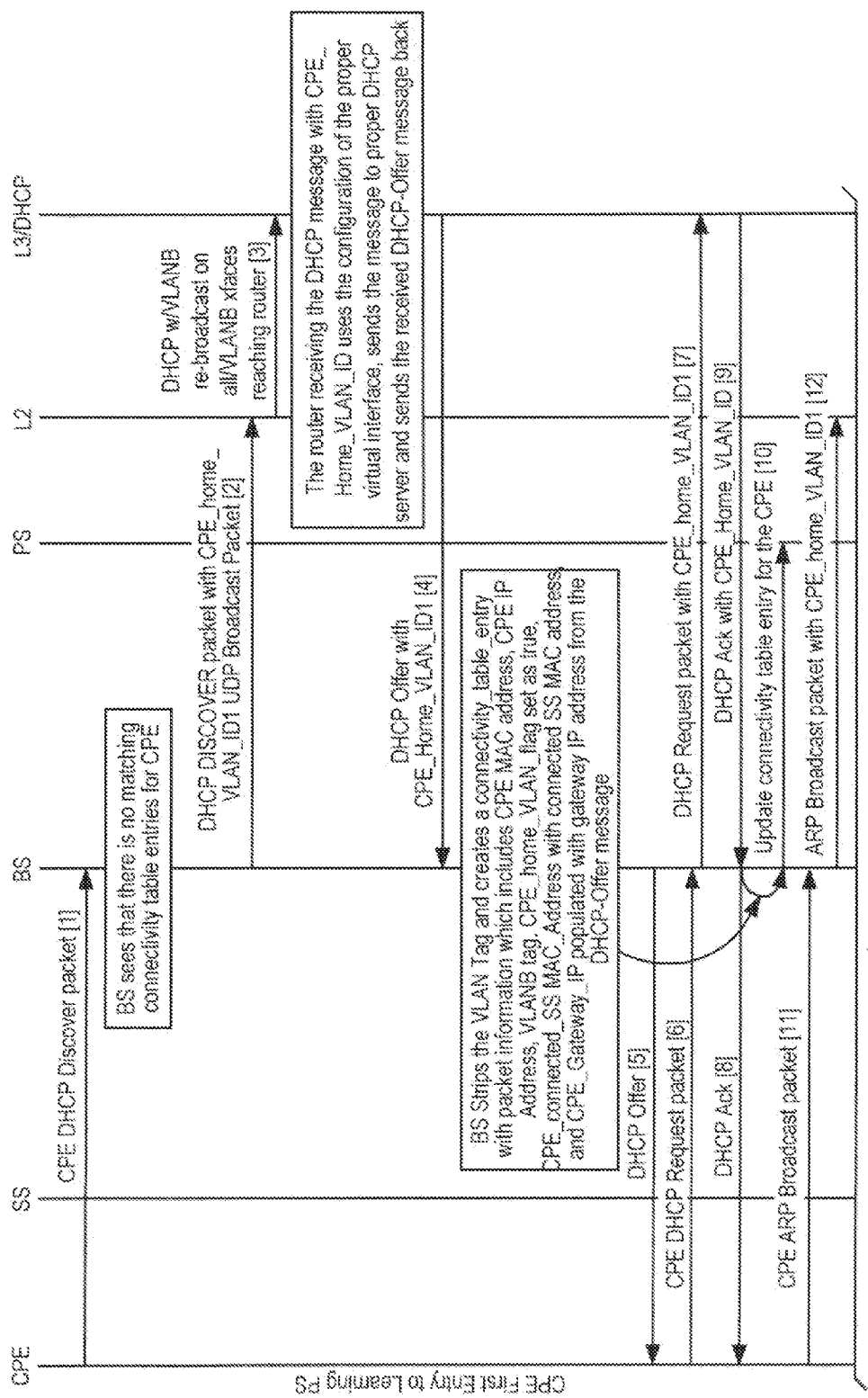
FIGS. 4A-9B depict communications transactions according to certain aspects of the invention.
Figure 4B:
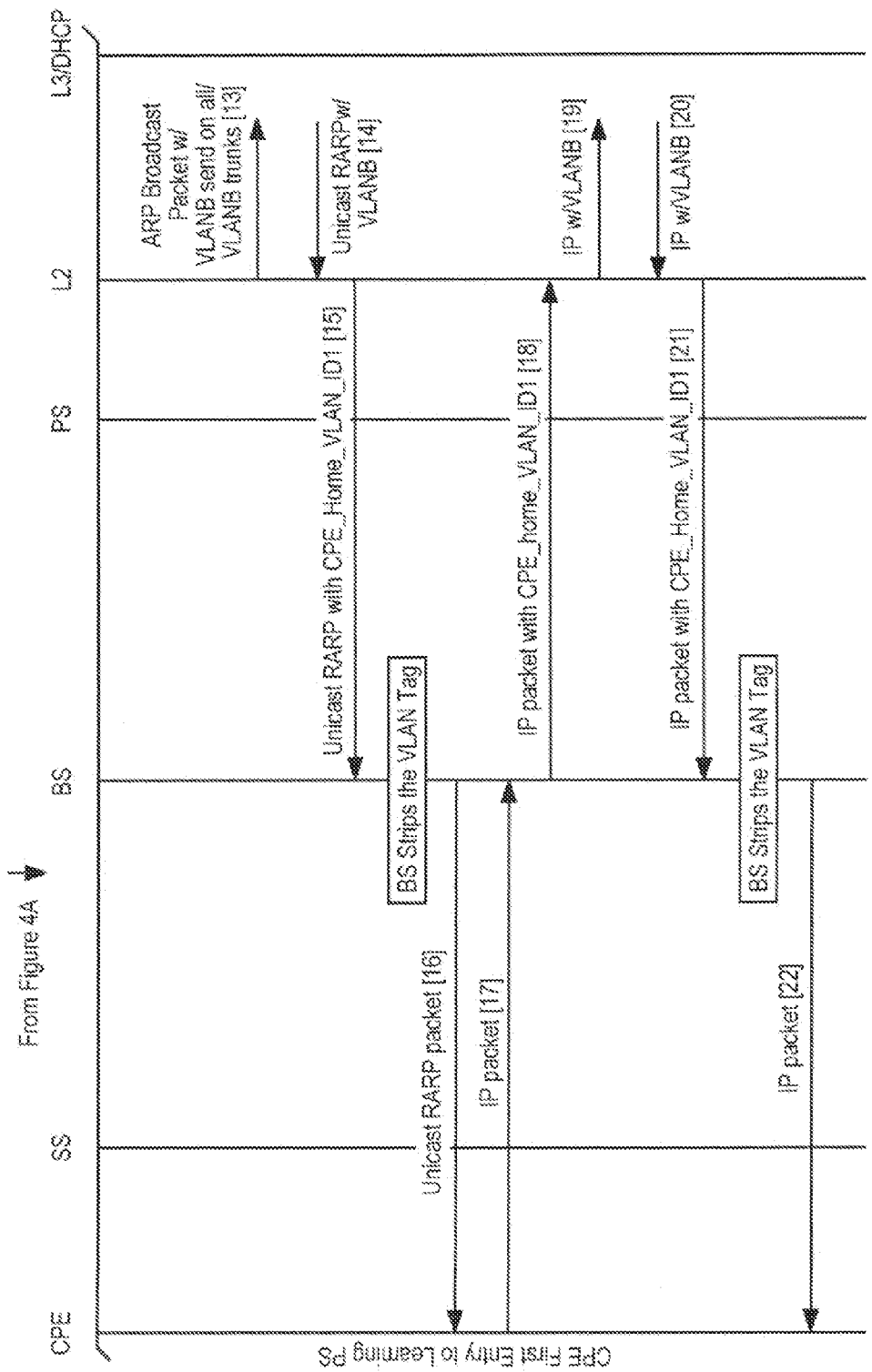
Figure 5A:
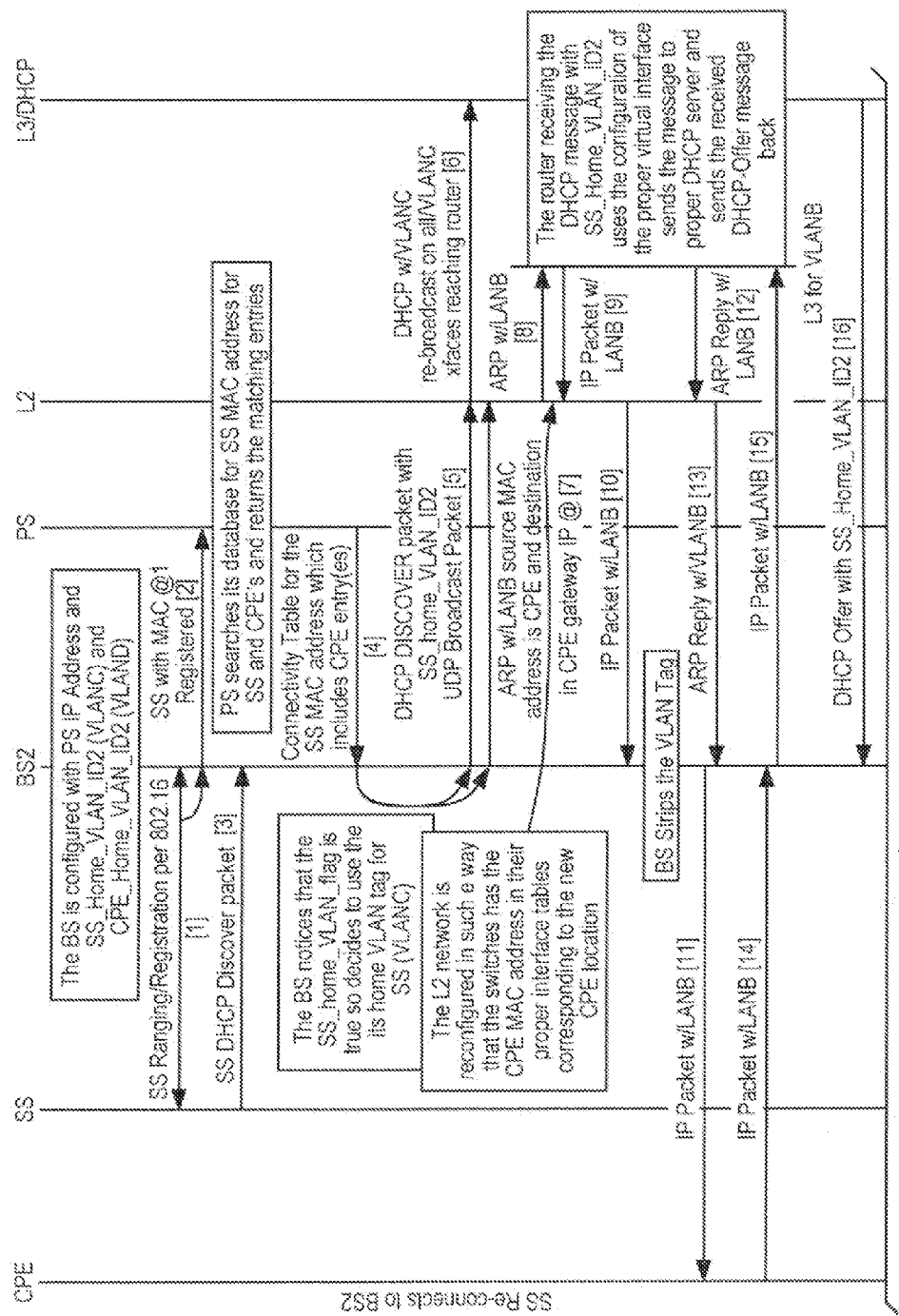
Figure 5B:
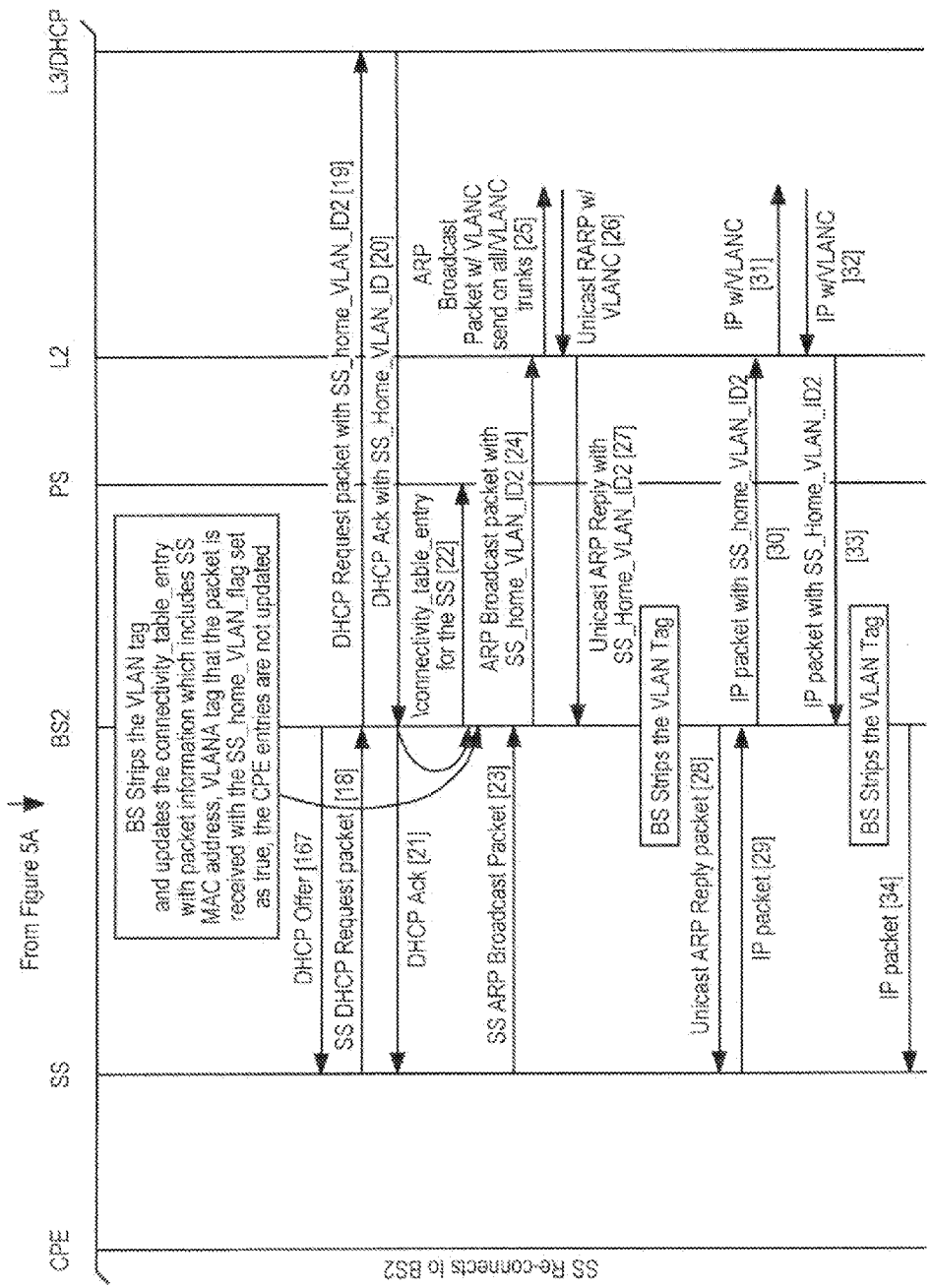
Figure 6:
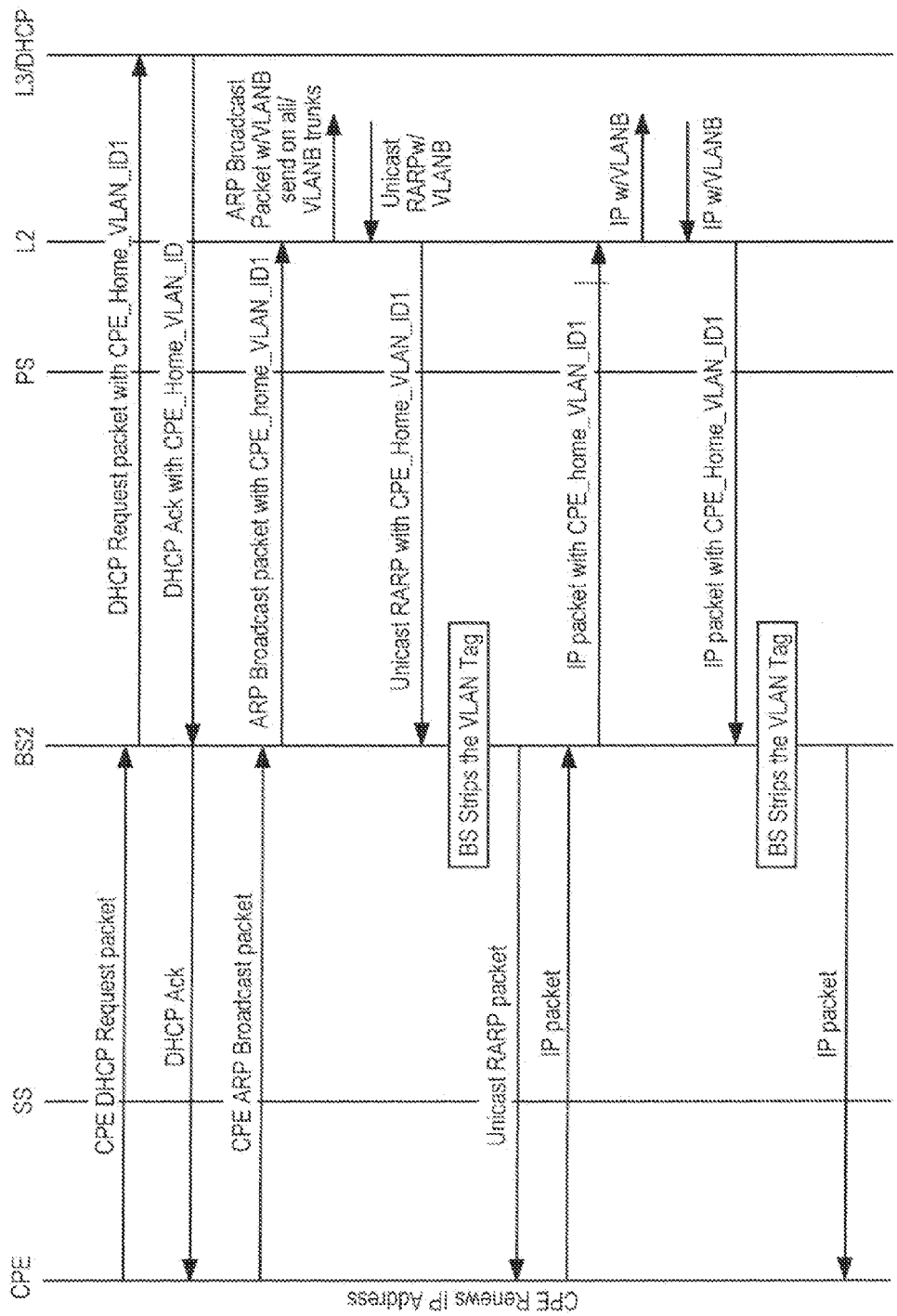
Figure 7A:
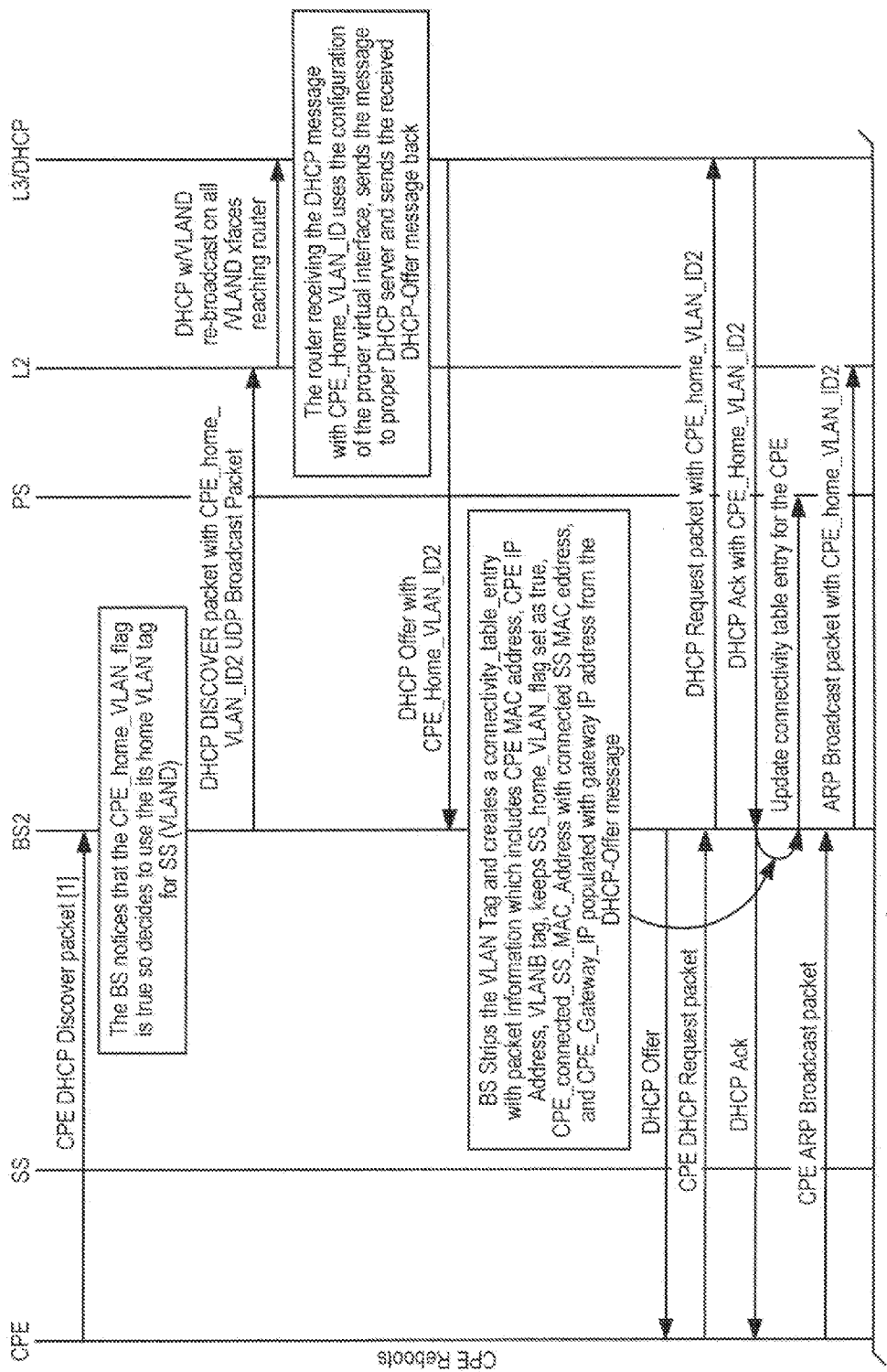
Figure 7B:
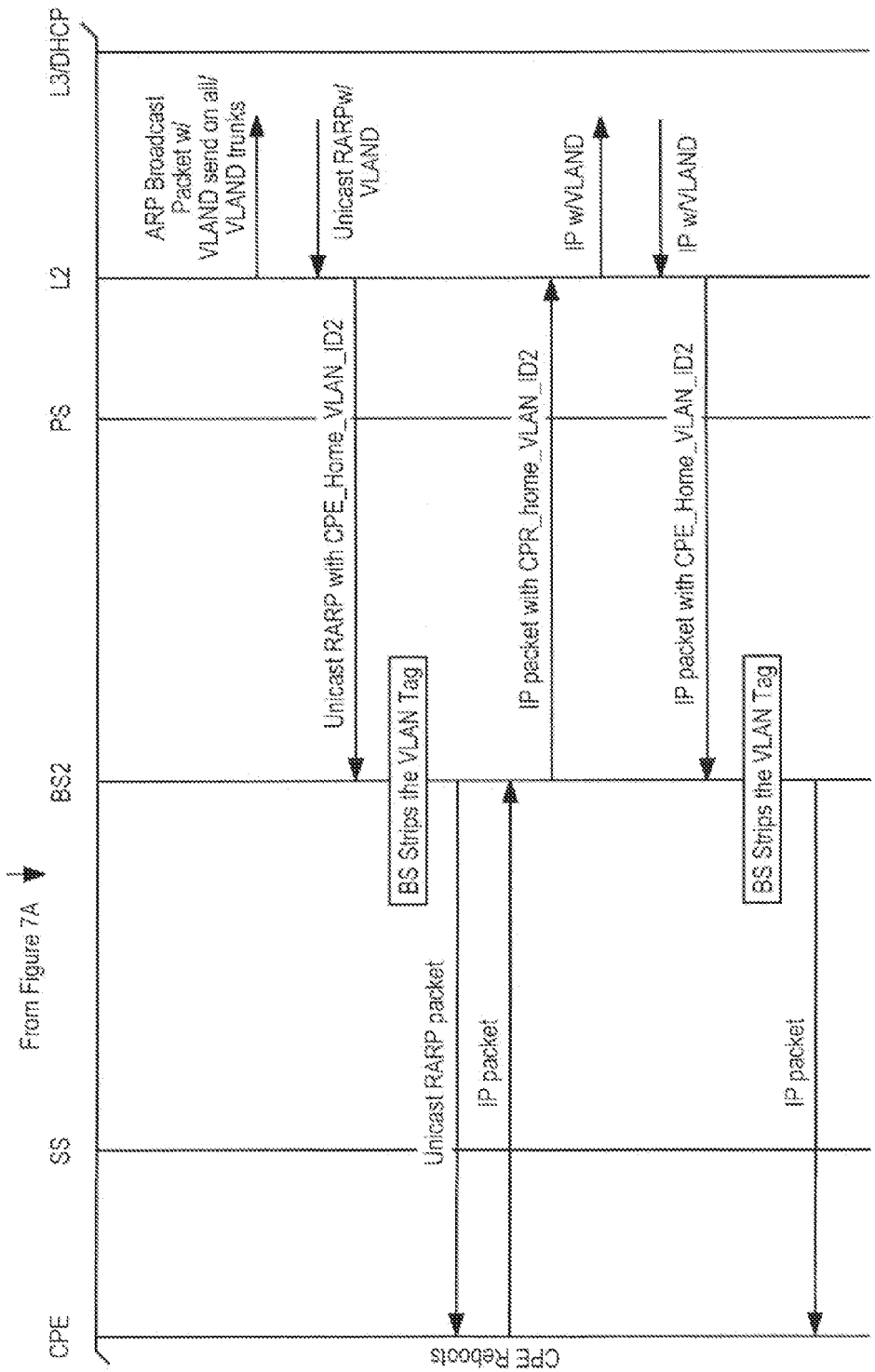
Figure 8A:
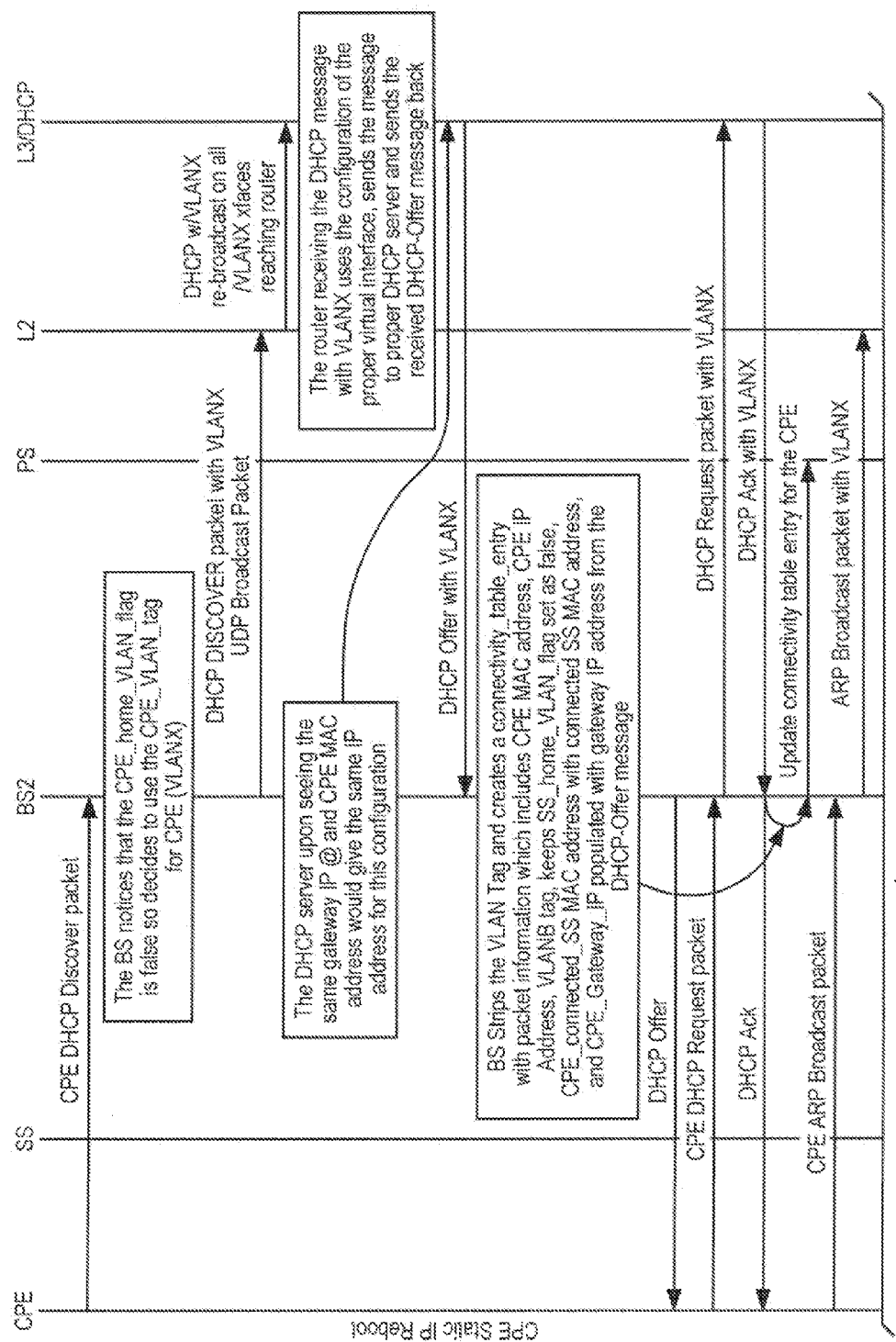
Figure 8B:
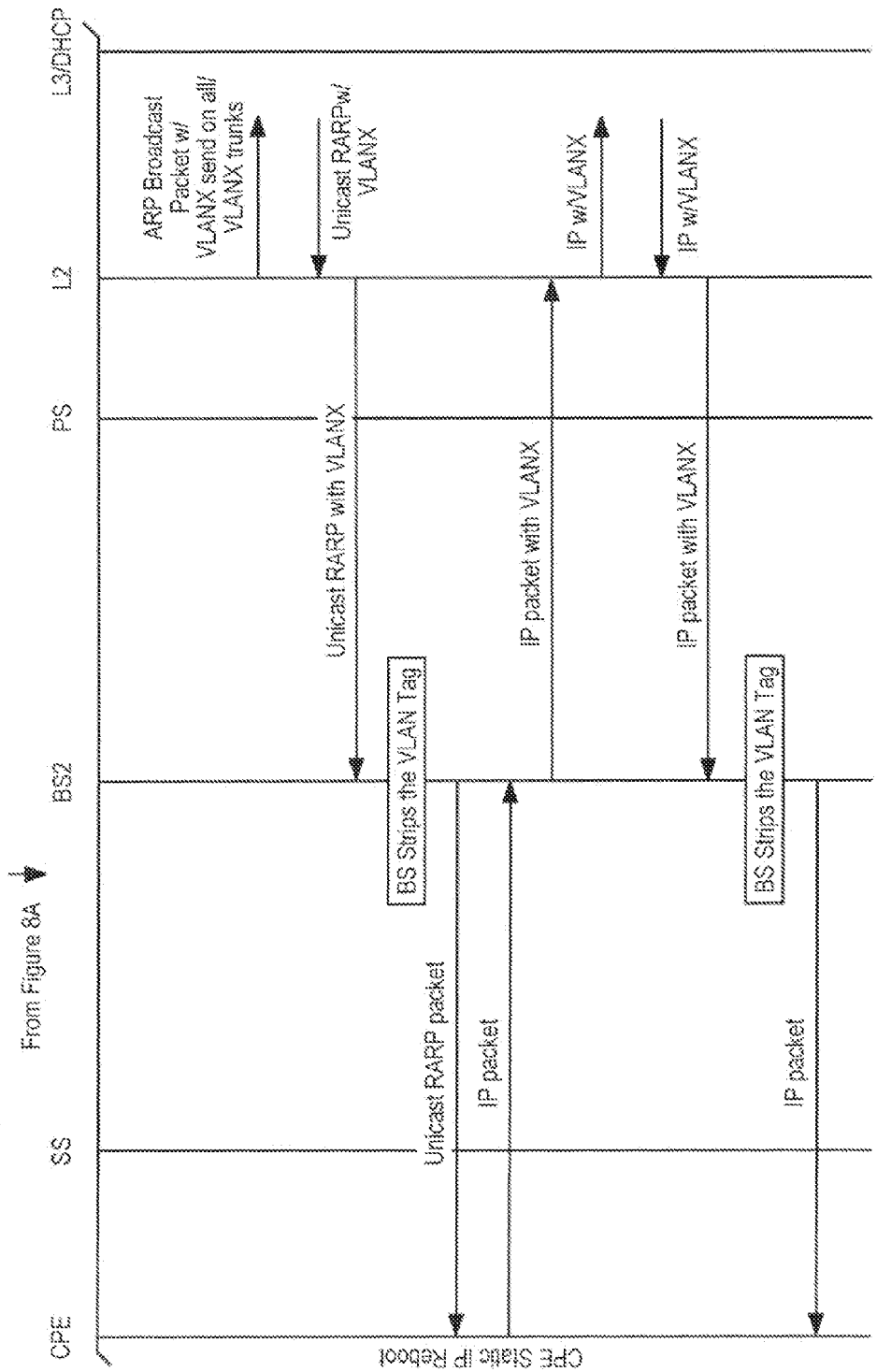
Figure 9A:
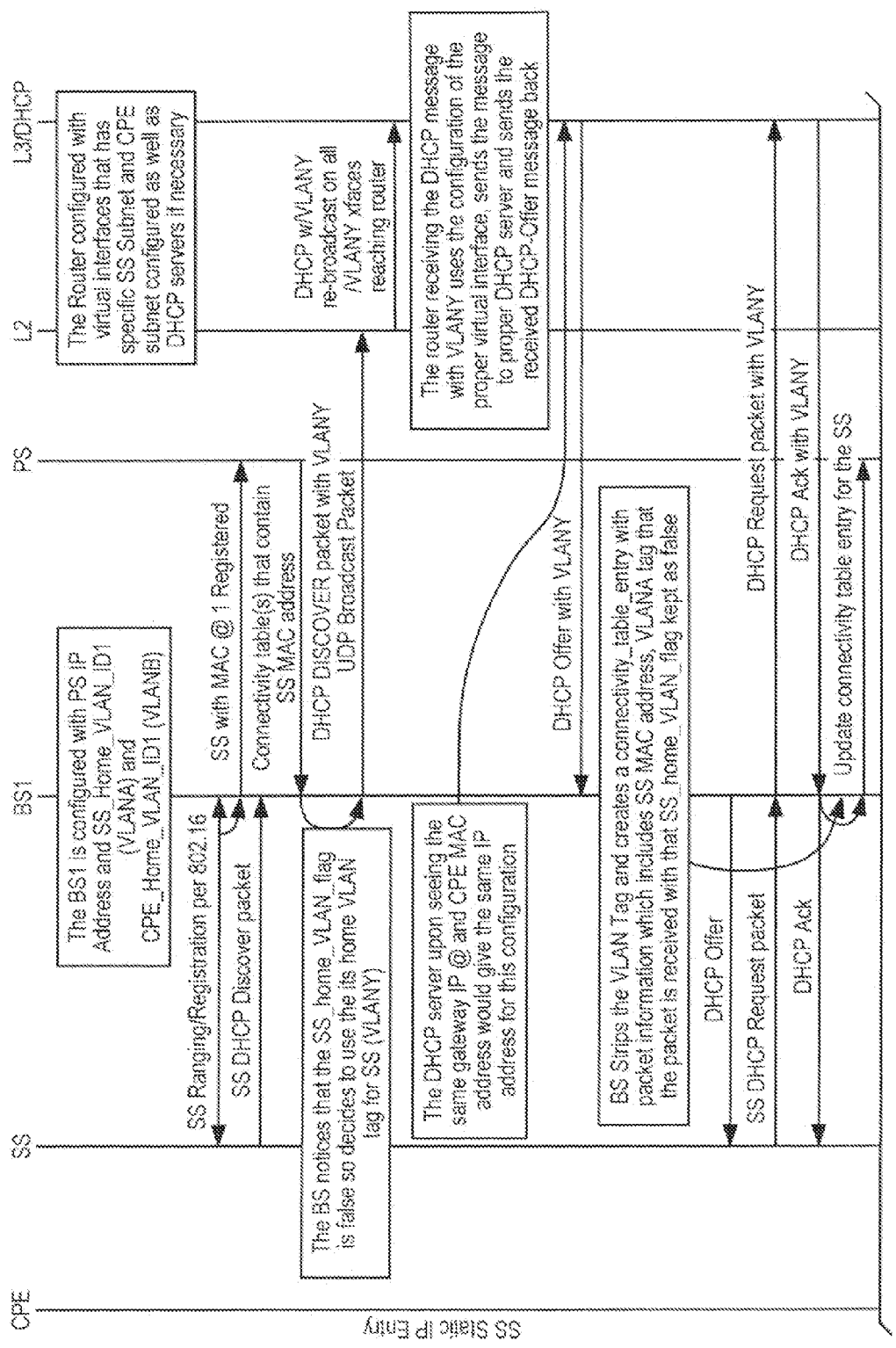
Figure 9B:
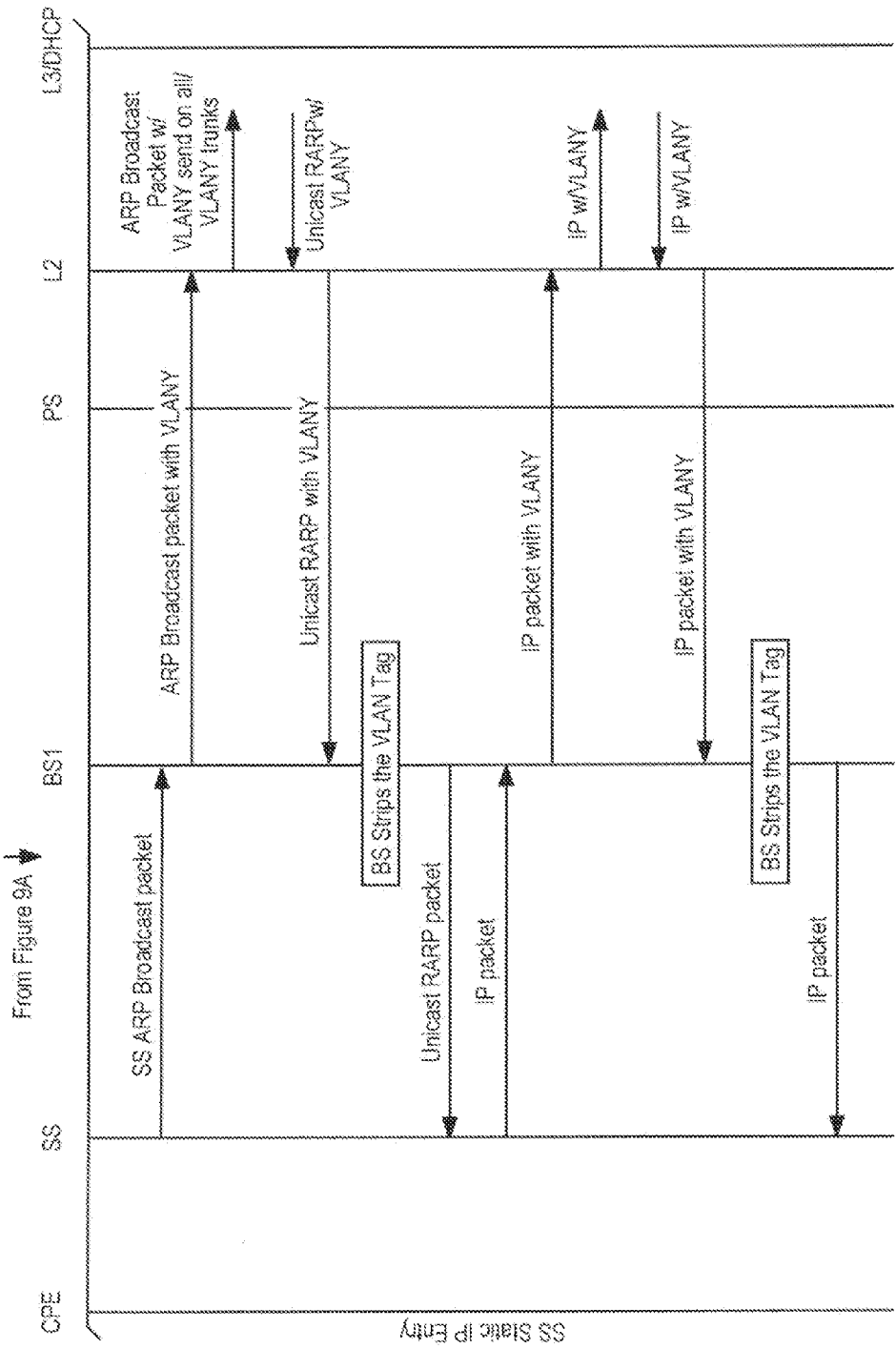

Referring to FIG. 3, in certain embodiments, a base station 30 can be adapted and configured using combinations of hardware and software 34 to tag packets 320 with proper VLAN identification. Typically, the adapted base station 30 is provided with a table 36 for mapping Internet Protocol ("IP") and media access control ("MAC") addresses to one or more VLAN tags. A received packet 320 can be tagged and associated with an appropriate VLAN tag when the packet 320 includes an IP and/or MAC address maintained in the table 36.

In certain embodiments, dynamic tagging is implemented using link session information. The link session information can include a combination of elements such as subscriber station identification, base station identification and MAC address of a subscriber station host. The link session information can be accumulated and provided by the base station. Thus, dynamic tagging permits packet tagging based on information that is not limited to the interface at which the packet is received.

In certain embodiments, a base station can use packet tags to indicate a link which is associated with the host/subscriber station. A corresponding IP address can be distributed through a relay agent instantiated for the link. In one example, packet tagging can conform to standards such as the IEEE 802.1q VLAN standard. In another example, packet tagging can utilize other types of tags such as MPLS tags. In certain embodiments, a base station can use VLAN tags that are statically configured in the base station. When the base station receives a packet it may tag the packet with a corresponding configured VLAN tag.

In certain embodiments, a router located at the edge of a layer-2 network can be configured such that each VLAN tag or each group of VLAN tags is associated with a virtual interface. A virtual interface can be provided such that the instantiation of the virtual interface can be configured based on the IP addressing needs of each base station. It will be appreciated that, in such embodiments, a router interface is effectively extended to the base station. In certain embodiments, a base station may use a Vendor Class Identifier or any other identifier to select a tag for a packet.

In certain embodiments, persistent storage is provided to maintain information describing a network configuration and traffic on the network. This information may indicate rules to be used in routing and tagging packets captured at a base station or subscriber station. The information may be stored as an addressable table, database or in any other suitable format. The information may be stored anywhere on the network and multiple copies may be maintained on one or more base stations and subscriber stations. In one example, tags and unique identifiers associated with subscriber equipment can be stored on one or more servers accessible to base stations in the network.

In certain embodiments network entry packets can be treated as special and processed as if obtained from a special interface. Network entry packets can include DHCP DISCOVER or PPPoE Active Discover Initiation packets. These network entry packets can be tagged using tagging methods different from the methods used for other packet types. Specific network entry behavior can be defined that simultaneously provides mobility of IP addresses through the use of dynamic VLANs and a fine-grained control of IP address distribution.

In one example, VLAN tags for IP network entry packets may be statically configured for each base station. A virtual interface can be assigned for each VLAN tag and configured as a DHCP relay agent. In some embodiments, a configuration process is implemented that operates in similar fashion to the process used for extending a router's virtual interface to a base station in handling DHCP packets. However, aspects of the present invention can accommodate dynamic VLAN behavior directly thereby permitting the provision of configurations adapted for other hosts and providing IP mobility without requiring the use of conventional mobile IP.

In certain embodiments of the invention, a VLAN tag can be fixed for certain network elements and hosts that are located behind certain subscriber stations. The illusion of fixed IP addresses for such network elements and hosts can be created even if subsequent network entry is made through a different base station. Furthermore, these capabilities can be provided without requiring providers to enter MAC addresses of hosts and subscriber stations to a DHCP server, and without requiring the use of customized DHCP code as is generally needed in conventional systems. It will be appreciated that conventional systems and methods often require reconfiguration of DHCP server data whenever a subscriber moves nomadically or otherwise between base stations. In conventional systems, the continual addition of subscriber station and base station information can render the process of re-configuration impractical. The unpredictable nature of RF links makes it very difficult or impossible for providers to envision all potential combinations of connection cases and pre-configure DHCP servers accordingly.

In certain embodiments of the invention, subscriber equipment can be associated with information regarding the base station at which the subscriber equipment initially entered the network. This information can be maintained in one or more databases and can be propagated through the network. The information can then be used to associate the subscriber equipment with packets regardless of changes in physical location of the subscriber equipment. Simply put, the configuration of the base station at which the network entry was made, or the base station at which a VLAN tag was loaded through a database located somewhere inside the network may be selectively used for VLAN tagging. Typically, entry of information can be made in a layer-2 network where IP mobility is desired. In many embodiments, the IP addresses will be initially assigned where the IP network entry is made.

Thus, and as illustrated below, in certain embodiments, subscriber equipment is associated with a network and/or network connection upon first entry to the network. The association is tied to the base station at the point of initial entry and a tag is generated. The tag can be distributed with a unique identifier to a plurality of other base stations such that, upon reentry, the network is configured to provide the subscriber station with the appearance of connection through the base station at which initial entry was made. This process can result in a transparent or virtual network connection from the subscriber station perspective.

Typically, a base station maintains a connectivity table that contains parameters including addresses associated with customer premises ("CPE") equipment including CPE and subscriber station MAC addresses ("CPE_MAC_address"and "CPE_connected_SS_MAC_address"), IP address ("CPE_IP_address" and "CPE_Gateway_IP_address"). This table can typically be searched by any of the identifiers. The connectivity table for customer premises equipment may be initialized to predetermined values. In the examples provided in Figs. 4A-9B, the meaning of the entries is as follows:

CPE_MAC_address: indicates the MAC address for the CPE that this entry is valid for. If this field is zero, the BS can populate the field with new information. If the BS has CPE connectivity_table entries returned but no new elements are available, the BS will drop the network entry packets.

CPE_IP_address: If the CPE IP address is zero the CPE with MAC address CPE_MAC_address is not allowed to use IP address unless it runs through IP network entry.

CPE_VLAN_tag: The CPE VLAN tag is the tag that must be used by the BS for all packets that are not network entry packets for CPE_MAC_address and CPE_IP_address. If this field is zero it means that there is no VLAN tag associated with this field and the packets must be sent with no tags for this CPE.

CPE_home_VLAN_flag: This field is to be used as a Boolean field today but it is strongly suggested that this field to be used as a bit field of first bit of a byte so that future extension to this field as generic flag usage will be possible. If this field is true, the IP network entry packets will use VLAN tags as configured in the BS. If this field is false the IP network entry packets will use the VLAN tags as indicated in the CPE_VLAN_tag field. The existence of a zero CPE_home_VLAN_flag and CPE_MAC_address is zero is allowed and means that the unspecified CPE is to use the CPE_home_VLAN_flag for IP network entry packets.

CPE_Connected_SS_MAC_address: This field will always be populated when a CPE entry in connectivity table exists. The field states that all the packets coming for this table entry must be coming though the SS whose MAC address is the same as CPE_Connected_SS_MAC_address.

CPE_Gateway_IP_address: This field must not be zero if the CP_IP_address is not set to zero. If the CPE_IP_address is zero this field must be set or assumed as zero.

A connectivity_table entry for a subscriber station can have the following format:

SS_MAC_address: The field must always be populated. The field indicates a registered SS with the MAC address.

SS_VLAN_tag: The SS_VLAN_tag is the tag that must be used by the BS for all packets that are not network entry packets for SS_MAC_address. If this field is zero it means that there is no VLAN tag associated with this field and the packets must be sent with no tags for this SS.

SS_home_VLAN_flag: This field is to be used as a Boolean field today but it is strongly suggested that this field to be used as a bit field of first bit of a byte so that future extension to this field as generic flag usage will be possible. If this field is true, the IP network entry packets will use VLAN tags as configured in the BS. If this field is false the IP network entry packets will use the VLAN tags as indicated in the SS_VLAN_tag_field.

Typically, a base station is configured with primary and secondary addresses that can be defined through DNS. Each wireless interface of a base station can have an SS_Home_VLAN_ID (HomeID) configured for the subscriber station. Where an SS_Home_VLAN_ID is not configured, the base station may refrain from tagging packets coming from the subscriber station. Where a CPE_Home_VLAN_ID is not configured for CPEs, the BS may not tag broadcast DHCP packets coming from the CPE. However, if the corresponding CPE_home_VLAN_flag is true, the CPE_VLAN_tag may be used as indicated in BS.11.

A base station is typically configured with a default CPE_Home_VLAN_ID for any CPE connected using PPPoE. Subnet settings may be maintained that take the form of address and mask where the address does not have to be an address belonging to the base station, and the VCI field is in a form having less than 255 octets. The base station in one example can be configured for at least 8 CPE_Home_VLAN_ID tags for CPE using IP subnet or VCI as a field.

In certain embodiments, a base station can intercept DHCP Discover messages coming from its wireless interface. The base station may tag the broadcast DHCP Discover messages with appropriate VLAN tag. In certain embodiments, upon reception of DHCP Offer message reply to broadcast DHCP DISCOVER message, the base station may create a connectivity_table_entry in its connectivity table using DHCP Offer information and a VLAN_ID provided in a corresponding DHCP Offer message and identification of a Gateway assigned to the CPE. In another example, a DHCP ACK message may be used in place of the DHCP Offer message.

Typically, a base station will create a connectivity_table_entry whenever it detects a broadcast PPPoE Active Discover Initiation packet using the PPPoE VLAN-ID for PPPoE CPEs. When a connectivity_table_entry is created via the DHCP process, the BS may update a centralized Persistent Storage (PS) with the connectivity_table_entry information. When the base station receives an ARP message/RARP message from its network interface that indicates the IP address belongs to some other SS/CPE, the BS may reset its connectivity_table_entry for that entity and update the PS. The base station may be able to age the connectivity_table_entry by changing its state from active to inactive per ARP table rules.

Upon receiving an IP packet from CPE, a base station may use its connectivity_table to check whether the packets IP and MAC address paired with connectivity_table_entry, and whether the pair is assigned to the SS with the right MAC address in the same connectivity_table_entry. Upon receiving a PPP packet from the CPE, a base station may use its connectivity_table to check whether the CPE is assigned to the SS with the right MAC address. The base station may tag every air-interface ingress packet with proper CPE_VLAN_tag as indicated in its connectivity_table_entry for the CPE using MAC address as the identifier. Upon receiving a packet through air-interface which is not IP network entry packet and is not within its connectivity_table, a base station may drop the packet and report the event and log it accordingly which is to be filtered by a switch in the CLI.

In certain embodiments, the architecture includes persistent storage for maintaining connectivity_table entries. Persistent storage typically can provide all connectivity_table entries associated with the SS_MAC_address. Typically, persistent storage can be updated upon discovery of new or changed information concerning the network. Updates may be automatic and, in some embodiments, a user may modify information maintained in the persistent storage.

Additional Descriptions of Certain Aspects of the Invention

Certain embodiments of the invention provide a method for tagging packets in a wireless network, comprising detecting at a first base station, initial entry of subscriber equipment into a wireless network, generating a unique network tag for the subscriber equipment, the network tag associating the subscriber equipment with the first base station, distributing the unique network tag to one or more other base stations, and configuring a network connection for the subscriber equipment based on the unique network tag upon reentry of the subscriber equipment to the network. In some of these embodiments, the detecting initial entry includes the step of receiving a network entry packet at the first base station, the network entry packet including a unique identifier associated with the subscriber equipment. In some of these embodiments, the reentry is detected at a second base station different from the first base station. In some of these embodiments, distributing includes adding the unique network tag and a unique identifier received from the subscriber equipment to a list comprising a plurality of unique identifiers and corresponding unique network tags and distributing at least a portion of the list to the one or more other base stations. In some of these embodiments, the configuring the network connection includes providing an IP address assigned to the subscriber equipment. In some of these embodiments, the IP address is distributed through a relay agent instantiated for the network connection. In some of these embodiments, the unique network tag is an IEEE 802.1q tag. In some of these embodiments, the unique network tag is an MPLS tag. In some of these embodiments, the method further comprises attaching the unique network tag to packets directed to the subscriber station and received at any of the one or more base stations. In some of these embodiments, the method further comprises attaching the unique network tag to packets received from the subscriber station at any of the one or more base stations. In some of these embodiments, the unique identifier includes a media access address associated with the subscriber equipment. In some of these embodiments, the subscriber equipment includes a personal computer. In some of these embodiments, the generating includes assigning the subscriber equipment to a virtual network associated with the first base station.

Furthermore, certain embodiments of the invention provide a method for managing entry of subscriber equipment into a virtual local area network ("VLAN"), comprising providing a base station with a plurality of network addresses associated with one or more VLANs, detecting initial entry of subscriber equipment into a wireless network at the base station, assigning a tag to the subscriber equipment that uniquely identifies the new subscriber equipment to one or more selected networks, and distributing the tag to at least one other base station, wherein upon subsequent connections of the subscriber equipment, the at least one other base station is configured to connect the subscriber equipment to transparently connect the subscriber equipment to the selected network. In some of these embodiments, the detecting initial entry includes the steps of receiving a network entry packet at the one base station, the network entry packet including a unique identifier associated with the subscriber equipment and adding the unique identifier to a list comprising a plurality of unique identifiers. In some of these embodiments, the method further comprises propagating the list to the at least one other base station. In some of these embodiments, the unique identifier includes a media access address associated with the subscriber equipment. In some of these embodiments, the subscriber equipment includes a personal computer. In some of these embodiments, the tag is associated with an IP address assigned to the subscriber equipment.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A system comprising:
a processor;
a memory including instructions configured to cause the processor to perform a method, the method comprising:
detecting initial entry of subscriber equipment into a wireless network at a first base station;
assigning a tag to the subscriber equipment that creates an association of the subscriber equipment with the first base station; and
providing to another base station a plurality of unique identifiers and corresponding tags, wherein the plurality of unique identifiers and corresponding tags includes the tag assigned to the subscriber equipment and a unique identifier of the subscriber equipment, wherein upon reentry of the subscriber equipment into the wireless network through the other base station, the other base station resumes the network connection at the other base station based on the tag as provided to the other base station by the system, wherein the other base station retrieves the tag based on the unique identifier received from the subscriber equipment during reentry through the other base station, and wherein the network connection maintains the association of the subscriber equipment with the first base station based on the tag.

2. The system of claim 1, wherein the system is the first base station.

3. The system of claim 1, wherein the detecting initial entry includes the steps of:
receiving a network entry packet at the first base station, the network entry packet including the unique identifier of the subscriber equipment; and
adding the unique identifier to a list comprising the plurality of unique identifiers and corresponding tags.

4. The system of claim 3, the method further comprising propagating the plurality of unique identifiers and corresponding tags to the other base station.

5. The system of claim 3, wherein the unique identifier includes a media access address associated with the subscriber equipment.

6. The system of claim 1, wherein the subscriber equipment includes a personal computer.

7. The system of claim 1, wherein the tag is associated with an IP address assigned to the subscriber equipment.

8. The system of claim 1, wherein the detecting initial entry includes the steps of:
receiving a packet at the first base station, the packet including the unique identifier of the subscriber equipment; and
adding the unique identifier to a list comprising the plurality of unique identifiers and corresponding tags.

9. The system of claim 1, wherein the tag is a network tag.

10. The system of claim 9, wherein the network tag is an IEEE 802.1q tag.

11. The system of claim 9, wherein the network tag is an MPLS tag.

12. A system comprising:
means for detecting initial entry of subscriber equipment into a wireless network at a first base station;
means for assigning a tag to the subscriber equipment that creates an association of the subscriber equipment with the first base station; and
means for providing to another base station a plurality of unique identifiers and corresponding tags, wherein the plurality of unique identifiers and corresponding tags includes the tag assigned to the subscriber equipment and a unique identifier of the subscriber equipment, wherein upon reentry of the subscriber equipment into the wireless network through the other base station, the other base station resumes the network connection at the other base station based on the tag as provided to the other base station by the system, wherein the other base station retrieves the tag based on the unique identifier received from the subscriber equipment during reentry through the other base station, and wherein the network connection maintains the association of the subscriber equipment with the first base station based on the tag.

13. A system comprising:
means for detecting, at a first base station, initial entry of subscriber equipment into a wireless network based on a unique identifier of the subscriber equipment;
means for generating a network tag for the subscriber equipment to create an association of the subscriber equipment with the first base station;
means for providing to one or more other base stations a plurality of unique identifiers and corresponding network tags that include the network tag for the subscriber equipment and the unique identifier of the subscriber equipment;
means for configuring a network connection for the subscriber equipment at the first base station based on the network tag such that the network tag associates the network connection with the first base station; and
upon the subscriber equipment reentering the wireless network through a second base station of the one or more other base stations, means for resuming the network connection at the second base station based on the network tag for the subscriber equipment as provided to the second base station, wherein the second base station retrieves the network tag based on the unique identifier received from the subscriber equipment during reentry through the second base station, and the network connection maintains the association of the subscriber equipment with the first base station based on the network tag.

* * * * *